_United States Patent Office_

3,436,354
Patented Apr. 1, 1969

3,436,354
PRODUCTION OF A SOLUTION CONTAINING
RADIOACTIVE TECHNETIUM
Wayne J. Gemmill, Sr., Milford, Pa., Paul A. King, Warwick, N.Y., and Victor J. Molinski, Ridgewood, N.J., assignors to Union Carbide Corporation, a corporation of New York
No Drawing. Filed Jan. 17, 1967, Ser. No. 609,760
Int. Cl. C09k *3/00;* C22b *61/04;* B01j
U.S. Cl. 252—301.1                                9 Claims

ABSTRACT OF THE DISCLOSURE

A process for producing solutions containing radioactive technetium-99m. The process comprises recovering technetium-99m from a solution containing molybdenum-99 using an organic solvent as an extracting medium, drying the organic solvent containing technetium-99m, evaporating the organic solvent, and then taking up the technetium-99m in a solvent.

---

The invention relates to a process for producing high purity solutions of radioactive technetium. The process comprises extracting technetium-99m from a solution containing molybdenum-99 by using an organic solvent as the extracting medium, drying the organic solvent containing technetium-99m, evaporating the organic solvent, and then taking up the radioactive technetium by a solvent.

Recent medical investigation has shown that technetium-99m is an extremely useful tool for diagnosis. High purity technetium-99m is used primarily as a radioisotope in a variety of medical research and diagnosis. It is well suited for liver, lung, blood pool and tumor scanning, and is preferred over other radioactive isotopes because of its short half-life which results in reduced exposure of the organs to radiation. In addition to medical uses, technetium-99m can also be employed in industrial applications, such as in the measurement of flow rates, process control, radiometric chemistry, and the like.

In the past, technetium-99m has been produced by milking from a generator. By this is meant that a preferential solvent was passed through a column of purified chromatographic alumina containing adsorbed molybdenum-99, the parent of technetium-99m. The solvent preferentially dissolved the technetium-99m, leaving the molybdenum-99 behind. The eluents from such columns contain detectable quantities of molybdenum-99 and metal ions such as aluminum and calcium.

M.S. Faddeeva et al., Zhur. Neorg. Khim., 3, 165–166 (1958), has disclosed a process for extracting technetium-99m from 6 N aqueous $K_2CO_3$ solutions containing dissolved molybdenum-99 containing material, using methyl ethyl ketone as the extracting medium, followed by washing the ketone solutions with $K_2CO_3$ aqueous solution. The technetium-99m recovered by this process, however, was not pure, since the product contained detectable $K_2CO_3$ and would therefore not be useable for many purposes, such as for medical purposes.

The present invention provides a process for producing high purity technetium-99m in solutions. The process involves the following steps:

(a) A technetium-99m composition is extracted from an aqueous solution containing a mixture of technetium-99m and molybdenum-99 (the parent of $^{99m}Tc$) by an organic solvent.

(b) The organic solvent containing the $^{99m}Tc$ is then dried by contacting it with a dehydrating agent.

(c) The organic solvent is removed by evaporation thereby leaving the $^{99m}Tc$ as a residue.

(d) The residue from step (c) is then taken up in a liquid.

The several steps (a) through (d) will now be discussed in turn.

Step (a).—The compound containing molybdenum-99 ($^{99}Mo$) is obtained from conventional sources such as by irradiating a molybdenum compound or by using fission-product molybdenum. Useful molybdenum-containing compounds include molybdenum trioxide, molybdic acid, sodium molybdate, ammonium molybdate, molybdenum metal (dissolved in an acid to form a salt), and the like. Molybdenum trioxide is preferred.

The molybdenum compound is dissolved in water. In many cases, the water will contain a high concentration of a dissolved salt, acid, or alkali which is used: (1) to assist in the dissolution of the molybdenum compound, and/or (2) to reduce the water-miscibility of the organic solvent used in this step.

Whether or not to use a salt, acid, or alkali in the water, and the nature of the salt, acid, or alkali thus depends upon the nature of the molybdenum compound and the nature of the organic solvent used.

Specific illustrative examples of salts, acids, or alkalis include sulfuric acid, potassium carbonate, sodium carbonate, ammonium hydroxide, sodium hydroxide, potassium hydroxide, and the like. The alkali metal carbonates, especially the highly soluble potassium carbonate, are preferred. The salt, acid, or alkali will be used in high concentration, for example, from 2 N to 6 N solutions are useful.

In order to achieve high recovery of technetium by the extracting solvent, the technetium should be in its highest oxidation state. Therefore, it is preferred to add an oxidizing agent to the aqueous solution in step (a). Examples include hydrogen peroxide, bromine, and the like.

The aqueous solution is then intimately contacted with an organic solvent by conventional means such as by agitation, or the like. The organic solvent used is selected so that it will preferentially extract the technetium and leave the molybdenum in the aqueous solution. Illustrative of such organic solvents are methyl ethyl ketone, 2,4- and 2,6-lutidine (i.e., dimethylpyridines), acetone, methyl isobutyl ketone, diethyl ketone, pyridine, piperidine, hexalin, furfural, benzyl alcohol, isoamyl alcohol, and the like. The ketones are preferred, and methyl ethyl ketone is more preferred.

After separating the organic phase (containing the technetium) from aqueous phase (which can be done by conventional methods such as by using a separatory funnel or by decantation), it is desirable to wash the organic layer several times to ensure substantially complete separation of molybdenum from technetium. The wash water will also normally contain a salt, acid, or alkali similar to the one that was originally used in the aqueous molybdenum solution. The factors that dictated whether or not to use, and the nature of, the salt, acid, or alkali if used, that applied to the aqueous molybdenum solution also apply here. High concentrations of alkali metal carbonate (i.e., 2 N to 6 N solutions), are especially useful in the wash water. Sodium carbonate is generally preferred. The wash water is, of course, separated from the organic layer by conventional means.

Step (b).—The organic solvent containing the technetium-99m is then dried by contacting it with a dehydrating agent. The dehydrating agent is selected so that it (a) will be insoluble in the organic solvent and (b) will not appreciably absorb or extract any of the technetium. Useful dehydrating agents includes potassium carbonate, silica gel, sodium carbonate, calcium oxide, potassium hydroxide, sodium hydroxide, and the like. Alkali metal carbonates are preferred, and potassium carbonate is more preferred.

The procedure for the dehydrating step can be conventional, such as by mixing the dehydrating agent with the organic solvent, followed by decantation and filtration or the like.

The dehydration step not only removes water, but it also apparently removes all inorganic impurities that were present in or that were introduced into the organic solvent. This enables the production of technetium compositions of very high purity. It has been observed that, contrary to the heretofore available $^{99m}$Tc, the product of this invention is free of other detectable metal ions and radioactive species.

Step (c).—The organic solvent containing the $^{99m}$Tc is then subjected to evaporation to remove the solvent. Conventional procedures can be used for the evaporation. Vacuum and/or heating can be used. Essentially complete separation of the organic solvent and the technetium is thereby effected, leaving the technetium-containing material as a residue product.

Step (d).—The residue product from step (c) is recovered simply by contacting it with a liquid. The technetium is normally fully taken up (probably dissolved) by the liquid in one simple mixing step. For example, if the vessel used for evaporation in step (c) is a flask, the technetium residue product can be recovered simply by swirling a liquid in the flask.

The liquid used in step (d) is dictated by the end-use intended for the radioactive technetium. For example, one end-use is as a diagnostic tool for medical investigations. For such uses, the liquid would be a pharmaceutically acceptable solution. Such solutions are well known in the art.

General considerations

It is believed that the technetium is produced by the process of the invention in the form of the pertechnetate ion ($TcO_4^-$). The exact compound, however, is not important because the technetium-99m is present in a useable form.

The equipment that is used for the process of the invention can be conventional. For instance, standard laboratory glassware can be used. Of course, the usual precautions for protection against radiation should be used in carrying out the process of the invention.

EXAMPLE

This example illustrates the use of the process of the invention to produce a pharmaceutically acceptable saline solution containing technetium-99m.

Daily preparation of reagents (1) Methyl ethyl ketone (MEK).—Place approximately 400 ml. of MEK in a distillation apparatus. Discard the first 50 ml. that is distilled. Keep the next 200–250 ml. that is distilled at a temperature of 79–80° and then stop the distillation and discard all remaining MEK.

(2) Equilibrated methyl ethyl ketone.—Add 125 ml. of freshly distilled MEK to 50 ml. of 6 N $K_2CO_3$ in a separatory funnel. Shake well and permit solutions to stand until there is complete separation of the aqueous phase and organic phase (about 20–30 minutes is necessary).

(3) Equilibrated 4 N $Na_2CO_3$.—Add 200 ml. of 4 N $Na_2CO_3$ to 50 ml. of freshly distilled MEK in a separatory funnel. Shake well and permit solutions to stand until there is complete separation of the aqueous phase and organic phase. (About 20–30 minutes is necessary.)

Preparation of $^{99}$Mo solution (1) Transfer 30 grams of irradiated $MoO_3$ into a 400 ml. tall form beaker containing a magnetic stirring bar.

(2) Add 150 ml. of freshly prepared 6 N $K_2CO_3$ containing 5 ml. of 30% $H_2O_2$. Place beaker on a magnetic stirrer and stir solution until it is clear. If solution does not appear to be clear after 10 minutes of stirring, add 20 ml. of pyrogen-free water and heat solution gently (do not boil).

(3) Transfer clear solution into a clean bottle and dilute solution to a total volume of 200 ml. with pyrogen-free water.

(4) Submit samples to Assay and Quality Control for $^{99}$Mo concentration and radioisotope purity check.

Extraction of $^{99m}$Tc (1) Transfer the $^{99}$Mo solution (should be approximately 200 ml.) into a Morton mixing flask.

(2) Add 100 ml. of freshly equilibrated MEK (see daily preparation of reagents) into the Morton flask. Turn on a stirring motor to agitate the solution. Stir vigorously (*without splashing*) for 10 minutes.

(3) Turn off stirrer and drain entire mixture into a separatory funnel. When transfer is complete, turn on the stirring motor for approximately 10 seconds; this aids in the removal of residual solution that is on the stirring veins and in the Morton flask. Allow the residual solution to drain into the separatory funnel and then close the stopcock of the Morton flask.

(4) Allow the aqueous and organic phases to separate (this takes several minutes) and withdraw all but a few ml. of the bottom layer (aqueous phase) into a tall form 400 ml. beaker. Store beaker in a safe place for further processing.

(5) Withdraw the residual aqueous solution from the separatory funnel into a disposable beaker and discard. Be careful not to allow the organic layer to be withdrawn from the separatory funnel during this step since it contains the $^{99m}$Tc.

(6) Withdraw the MEK portion into a clean beaker and return the MEK to the Morton mixing flask.

(7) Add 80 ml. of freshly equilibrated 4 N $Na_2CO_3$ to the MEK and stir the mixture for several seconds. Permit solutions to stand for about 5 seconds and then stir again for 2 seconds. Repeat On/Off stirring method two more times for a total of 4.

(8) Drain the solutions from the Morton flask into the separatory funnel and allow the two phases to separate.

(9) Withdraw the bottom layer (aqueous layer) into a disposable beaker and discard.

(10) Withdraw the MEK into a clean beaker and return the MEK to the Morton mixing flask.

(11) Add 80 ml. of freshly equilibrated 4 N $Na_2CO_3$ to the MEK and stir as described in Step 7.

(12) Drain the solutions in the Morton flask into another separatory funnel and allow the two phases to separate.

(13) Withdraw the bottom layer (aqueous layer) into a disposable beaker and discard. Allow approximately 10 drops of the organic phase to be withdrawn with the aqueous phase.

(14) Drain the MEK (organic phase) into a 150 ml. flask that contains 25 grams of anhydrous $K_2CO_3$.

(15) Swirl flask to insure mixing of the MEK and $K_2CO_3$.

(16) Using a Whatman 541 filter paper, filter the MEK into a dry 250 ml. round bottom flask that has a 24/40 standard tapered joint. Wash the anhydrous $K_2CO_3$ and the filter paper with two 10 ml. portions of distilled MEK and add rinse solutions to the filtered MEK.

Preparation of $^{99m}$Tc-saline solution (1) Put liquid nitrogen into a rotary evaporator cold trap. Attach the round bottom flask containing the MEK-$^{99m}$Tc to the rotary evaporator. The flask is partially immersed in the water bath, controlled at a temperature of 35–40° C.

(2) Apply vacuum and start the rotary evaporator.

(3) Evaporate the MEK (takes approximately 15–20 minutes) to dryness. Continue evaporation for approximately 5 minutes after *complete dryness* is observed in the round bottom flask.

(4) Remove round bottom flask from the rotary evaporator and add 10 ml. of isotonic saline to the flask. Swirl the saline in the round bottom flask to dissolve the $^{99m}$Tc that is absorbed on the walls.

(5) Measure the pH of the solution with pH paper by removing one drop of the solution with a disposable pipette. If the pH of the solution is between 4 and 8, proceed to the next step. If the pH is higher than 8, adjust the pH of the saline solution by the dropwise addition of 0.1 N HCl.

(6) Filter the $^{99m}$Tc-saline solution into a dust-free graduated vessel.

(7) Wash round bottom distillation flask with two 5 ml. portions of saline. Filter wash solution into same dust free graduated vessel.

(8) Add saline to the $^{99m}$Tc-saline solution until total volume in graduate is 30 ml. Cap graduated vessel and mix the solution thoroughly.

What is claimed is:

1. A process for producing solutions containing technetium-99m which comprises the steps of:
   (a) extracting technetium-99m from an aqueous solution containing a mixture of molybdenum-99 and technetium-99m with an organic solvent,
   (b) drying the organic solvent containing the technetium-99m by contacting the solvent with a dehydrating agent,
   (c) evaporating the organic solvent thereby leaving the technetium-99m as a residue product, and
   (d) taking up the residue product of step (c) in a liquid.

2. The process of claim 1 wherein the aqueous solution of step (a) is a concentrated alkali metal carbonate solution.

3. The process of claim 1 wherein the aqueous solution of step (a) is a concentrated potassium carbonate solution.

4. The process of claim 1 wherein the organic solvent is a ketone.

5. The process of claim 1 wherein the organic solvent is methyl ethyl ketone.

6. The process of claim 1 wherein the dehydrating agent is anhydrous potassium carbonate.

7. The process of claim 1 wherein the liquid of step (d) is a pharmaceutically acceptable liquid.

8. The process of claim 1 wherein the liquid of step (d) is a pharmaceutically acceptable isotonic saline solution.

9. The process of claim 1 wherein an oxidizing agent is employed in the aqueous solution of step (a) in order to maintain the technetium-99m in its highest state of oxidation.

References Cited

FOREIGN PATENTS 896,758   5/1962   Great Britain.

OTHER REFERENCES

Nuclear Science Abstracts, vol. 20, No. 12, June 1966, Abstract No. 20,566.

Nuclear Science Abstracts, vol. 20, No. 21, November 1966, Abstract No. 38,997.

Nuclear Science Abstracts, vol. 21, No. 4, February 1967, Abstract No. 4454.

CARL D. QUARFORTH, *Primary Examiner.*

M. J. SCOLNICK, *Assistant Examiner.*

U.S. Cl. X.R.

23—312, 18